Aug. 10, 1926.
J. VON WALDY
PNEUMATIC SPRING SUSPENSION
Filed April 19, 1924
1,595,435
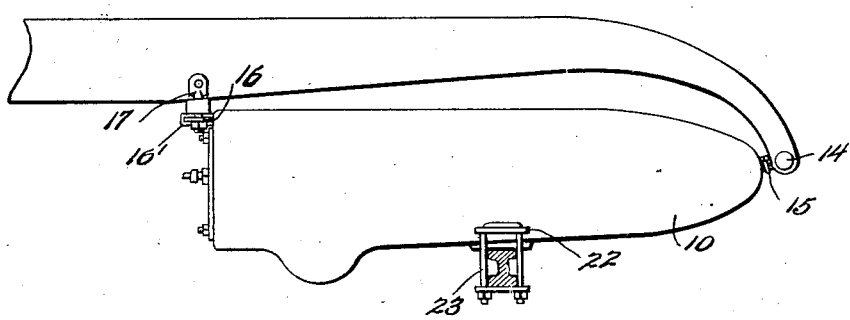
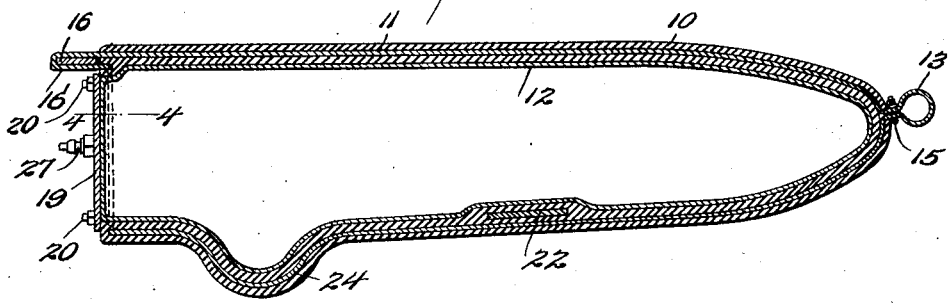
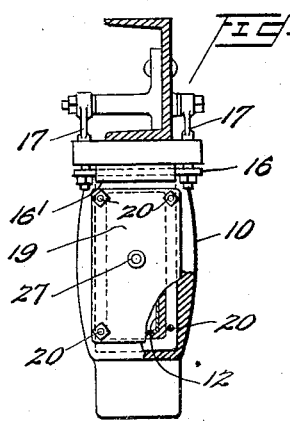
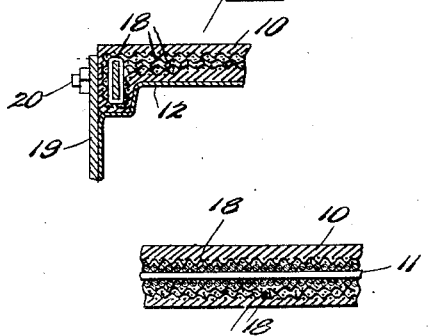
Inventor
Julius Von Waldy
By Emery, Booth, Janney + Varney
his Attorneys Patented Aug. 10, 1926.

1,595,435

UNITED STATES PATENT OFFICE.

JULIUS VON WALDY, OF NEW YORK, N. Y.

PNEUMATIC SPRING SUSPENSION.

Application filed April 19, 1924. Serial No. 707,724.

My invention aims to provide an improved pneumatic spring suspension for motor vehicles and the like, and is an improvement in spring suspensions of the general type shown in my prior application Ser. No. 704,473, filed April 5, 1924.

In the drawings wherein I have shown one embodiment of my invention for illustrative purposes:

Fig. 1 is a side elevation of a spring embodying my improvements;

Fig. 2 is a central longitudinal section of the device shown in Fig. 1;

Fig. 3 is an end view of the device shown in Fig. 1 looking from left to right and showing parts in section;

Fig. 4 is an enlarged, fragmentary cross section taken on the line 4—4 of Fig. 2; and Fig. 5 is an enlarged, fragmentary cross section of the reinforced spring element shown in Fig. 1.

Referring more particularly to the illustrative example of my invention, I have shown a reinforced pneumatic casing 10 constituting, in effect, a flexible beam having a continuous reinforcing element 11 associated with it and provided with means to secure it to the vehicle running gear and to the chassis.

As shown in Fig. 2 the casing 10 is made of flexible material such, for example, as vulcanized, corded rubber and is suitably shaped to replace the ordinary steel leaf spring commonly employed in motor cars.

The casing is preferably closed at one end and open at the other to provide for the insertion of an inner tube or air bag 12.

Referring to Fig. 2, I have shown the reinforcing element 11, comprising a continuous spring strip imbedded in the casing wall and extending from end to end at the top and bottom. This strip is preferably shaped at the ends of the casing to afford means for securing the spring to a chassis. To this end it may be bent to form a loop 13 at the front or nose end of the casing and this portion of the spring strip projects through the casing wall for attachment to the usual steel spring shackle bolt 14 on the chassis.

A suitable clamp 15, such as a bolt and bridge plate, may be secured to the neck of the loop to maintain its shape and to prevent tearing of the casing wall where the strip pierces it.

At the rear end of the casing (see Figs. 2 and 3) the spring strip 11 preferably presents a reversely bent projection 16' beyond the end of the casing wall at the top, the reversely bent portion being slightly spaced from the top of the strip to provide for the insertion of a transverse clamping plate 16. This clamping plate may have openings at its opposite ends to receive suitable securing elements 17 (Fig. 3) on the chassis (herein shown as shackle bolts).

The spring strip 11 across the rear end of the casing 10 has an opening (preferably oblong) in it (Fig. 3) to receive the inner tube 12 and, as best shown in Fig. 4, the strips at the side of the opening are securely imbedded in the casing. One or more embracing strips of gummed fabric 18, wound about and vulcanized on the strips, form a secure and convenient means of attaching.

A suitable closure plate 19 (Fig. 2) may be secured over the opening in the end of the casing conveniently by stud bolts 20 projecting from the spring strip 11. This closure has an opening to accommodate the valve stem 27 of the inner tube.

The bottom of the casing 11 is shown as being connected to the vehicle axle by a clamping plate 22 imbedded in the casing wall and having provision for U-bolts 23. The plate 22 (in Fig. 2) is imbedded in the casing preferably above the reinforcing spring element 11 so that, upon recoil of the vehicle the resulting stresses will be partially carried by the reinforcing element.

To prevent the reinforcing element 11 from cutting the fabric of the casing and to strengthen the bond between it and the rubber, I have shown a wrapping of small fabric cord (preferably gummed) wound about the element, as a further strengthening means for the casing and have shown a plurality of layers of the corded fabric 18 imbedded in it and some of them are preferably arranged on opposite sides of the reinforcing element 11.

The reinforcing element 11 may be bent, as shown in Figs. 1 and 2, to form a compensating section 22 between the axle and the rear end of the casing, and the casing is shaped accordingly. This bend or curve permits the element 11 to flex either upwardly or downwardly without any resulting tension or compression; that is to say, it can either contract and elongate freely longitudinally as the vehicle vibrates upon striking obstructions. Thus the rigid rear end of the casing is partially relieved of direct stresses and a greater range of deformation of the casing is made possible than would be the case if the element were straight. However, under some conditions this compensating bend may be dispensed with.

In the use of my improved spring suspension that portion of the reinforcing element in the top wall of the casing serves as a tension element to prevent undue upward flexure of the casing so that it will not strike the chassis when the vehicle strikes obstructions. The side walls of the casing are free to flex and produce the desired cushioning effect while the bottom portion of the reinforcing element in addition to its other functions serves as a leaf spring carrying a part of the load.

From the foregoing description it will be observed that my improved suspension illustrates the necessity for special securing elements for the vehicle chassis and that it may easily be substituted for an ordinary steel spring by an unskilled mechanic. Thus I have produced a pneumatic spring that combines in the same structure the advantageous characteristics of an air cushion and a steel spring.

Obviously my invention is not restricted to the specific embodiment thereof, herein illustrated and described, but it is susceptible of various changes.

What I claim and desire to secure by Letters Patent is:

1. A reinforced pneumatic spring comprising an elongated tubular casing having a reinforcing element embedded in its top and bottom walls, said element projecting through the casing adjacent the ends and shaped to provide means for securing it to the vehicle chassis.

2. A pneumatic spring comprising an elongated casing closed at one end and open at the other, a continuous reinforcing element extending longitudinally of the casing and embedded in the top and bottom walls thereof, and a closure for said open end.

3. A spring for vehicles comprising an elongated fabric casing, an inflatable inner tube in the casing and reinforcing means in the upper and lower walls of said casing, said reinforcing means having provision for securing the casing to a vehicle chassis.

4. A pneumatic spring comprising an elongated casing closed at one end and open at the other, a continuous reinforcing element extending longitudinally of the casing and embedded in the top and bottom walls thereof, and a closure for said open end, said reinforcing element extending across the open end of said casing and presenting means for securing said closure thereto.

5. A pneumatic spring comprising an elongated casing closed at one end and open at the other, a continuous reinforcing element extending longitudinally of the casing and embedded in the top and bottom walls thereof, and a closure for said open end, said reinforcing element comprising a flat strip of spring steel presenting a portion extending across and embedded in said open end of this casing and also having an opening registering with said open end, and bolts carried by said portion for securing said closure thereto.

6. A spring suspension for vehicles comprising in combination an elongated inflatable casing having a leaf spring reinforcement embedded therein and extending longitudinally thereof said leaf being bent between the ends to provide for elongation and contraction due to flexure.

7. A spring suspension for vehicles comprising, in combination, an elongated, inflatable casing having a reinforcing metallic strip embedded therein and extending from end to end thereof in its top and bottom walls, said strip having provision at the ends of said casing for attachment to a vehicle, and means intermediate the ends of said casing also for attachment to a portion of the vehicle.

In testimony whereof, I have signed my name to this specification.

JULIUS VON WALDY.